United States Patent [19]

Temino et al.

[11] 4,168,095

[45] Sep. 18, 1979

[54] PANELLING ARRANGEMENT FOR A MOTOR VEHICLE

[75] Inventors: Satoshi Temino, Tokyo; Seiji Koshiba, Yokohama; Kazuo Takeuchi, Chiba, all of Japan

[73] Assignee: Nissan Motor Company, Limited, Yokohama, Japan

[21] Appl. No.: 771,629

[22] Filed: Feb. 24, 1977

[30] Foreign Application Priority Data

Feb. 27, 1976 [JP] Japan .............................. 51/22786[U]

[51] Int. Cl.² ........................ B62D 25/14; B60K 35/00
[52] U.S. Cl. ........................................ 296/70; 180/90; 340/79
[58] Field of Search ...................... 296/70; 340/79, 80, 340/85; 180/90

[56] References Cited

U.S. PATENT DOCUMENTS 3,786,412  1/1974  Capriotti .................................. 340/79
3,806,721  4/1974  Murphy, Jr. ........................ 240/8.16

Primary Examiner—Richard A. Bertsch

[57] ABSTRACT

A lamp casing for an indicating lamp is fixed to a rigid panel member of the dashboard such that a socket opening formed in the lamp casing is substantially exposed to the driver's compartment. A cover member for concealing the unsightly parts surrounding the lamp casing is removably fixed to the lamp casing, so that the replacement of a burned out lamp with a new one can be simply done.

13 Claims, 11 Drawing Figures

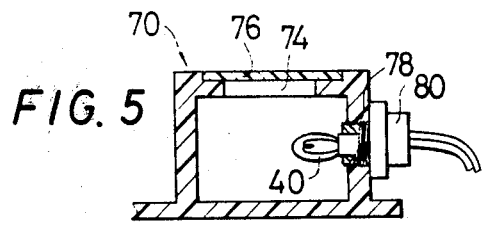
FIG. 5
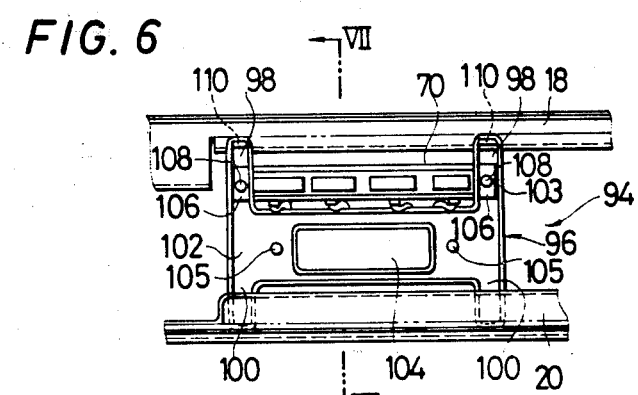
FIG. 6
FIG. 7
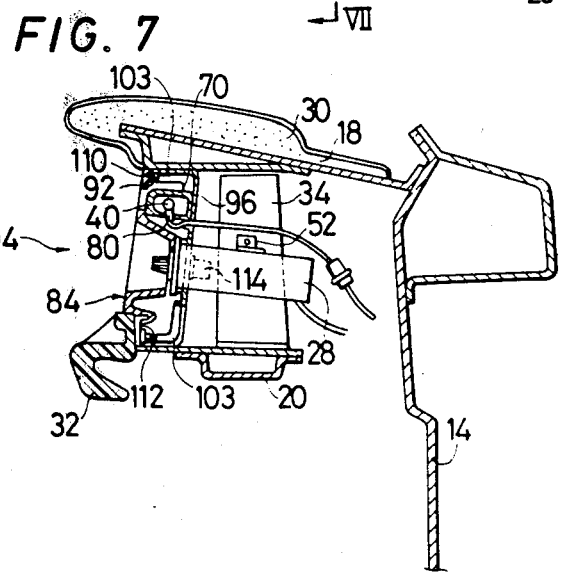

PANELLING ARRANGEMENT FOR A MOTOR VEHICLE

The present invention relates in general to a panelling arrangement of a motor vehicle for mounting thereupon several kinds of gauges and meters, and more particularly to an indicating lamp mounting structure in the panelling arrangement by which structure the replacement of the burned-out lamp with a new one can be simply made.

It is an object of the present invention to provide an improved panelling arrangement for a motor vehicle, which is constructed to facilitate replacement of the burned-out lamps with new ones.

It is another object of the present invention to provide an improved panelling arrangement by which the lamps can be changed from the front of the panelling arrangement.

It is still another object of the present invention to provide an improved panelling arrangement for mounting an indicating lamp on a dashboard of a motor vehicle having a passenger compartment, comprising: a rigid elongate panel member transversely and stationarily disposed inside the compartment while incorporating with the dashboard; a base member firmly fixed to the rigid elongate panel member; a lamp casing member containing therein the indicating lamp and having therein first and second openings, the first opening being covered with a labeled translucent plate and the second opening being sized to allow the indicating lamp to pass therethrough, the lamp casing being firmly connected to the base member in such an arrangement that the first and second openings are substantially exposed to the passenger compartment; a socket member detachably inserted into the second opening of the lamp casing while removably holding the indicating lamp in the lamp casing; a cover member for covering unsightly parts surrounding the lamp casing; and fixing means for releasably fixing the cover member relative to the lamp casing in a snap fitting manner.

Other objects and advantages of the present invention will become apparent from the following description when taken in conjunction with the accompanying drawings, in which:

FIG. 5 is a sectional view taken along the line V—V of FIG. 4;

FIG. 6 is a fragmentary front view of a second preferred embodiment of a panelling arrangement of the present invention, cover means being removed away for clarity;

FIG. 7 is a sectional view taken along the line VII—VII of FIG. 6;

Prior to explaining the construction of the improved panelling arrangement of the present invention, a description of a conventional panelling arrangement will be given with the aid of FIGS. 1 and 2 in order to clarify the inventive steps of the subject invention.

Figure 1:
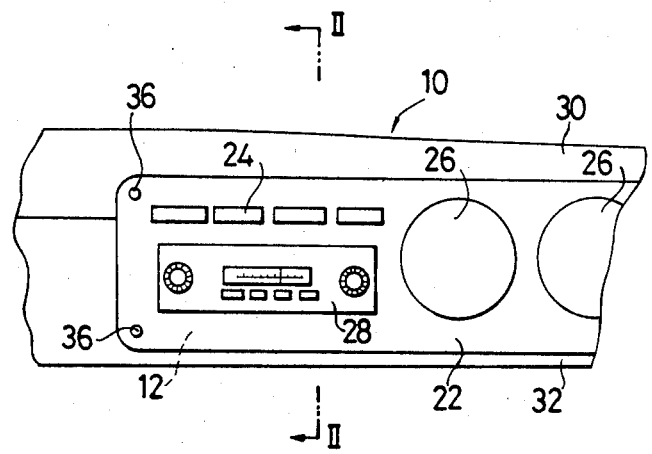
FIG. 1 is a fragmentary front view of a conventional panelling arrangement.
Figure 2:
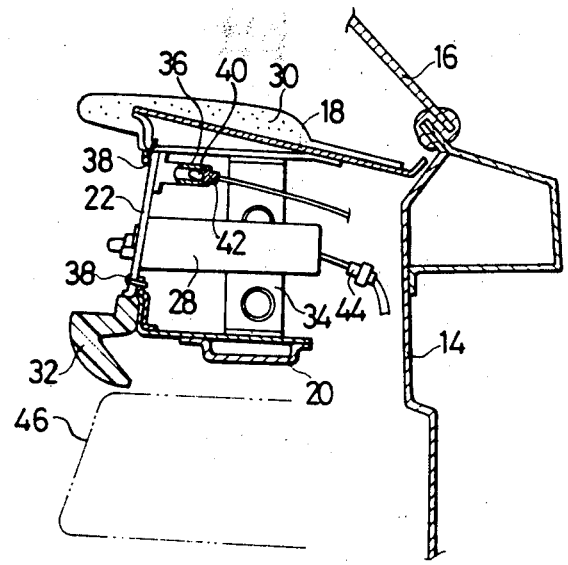
FIG. 2 is a sectional view taken along the line II—II of FIG. 1.

In FIGS. 1 and 2, there is illustrated a conventional panelling arrangement which is generally designated by the numeral 10. The arrangement 10 is installed in such a front portion of the vehicle driver's compartment (not shown) as including a fire wall 14 positioned under a windshield 16, and generally comprises upper and lower elongate panels 18 and 20 transversely disposed in the front portion of the compartment, a gauge and meter panel 22 carrying thereupon several kinds of gauges 24 and meters 26 and radio set 28, upper and lower paddings 30 and 32 covering the upper and lower elongate panels 18 and 20 while surrounding the gauge and meter panel 22, and a cross member 34 spanned between the upper and lower elongate panels 18 and 20. As seen from FIG. 2, the gauge and meter panel 22 is equipped at its back side with separated several lamp casings 36 and is firmly fixed at its upper and lower sections to the upper and lower elongate panels 18 and 20 by means of bolts 38. Each indicating lamp 40 is fitted to a socket 42 removably fixed to its lamp casing 36. Designated by the numeral 44 is a connector for connecting the radio set 28 to a battery (not shown).

With the construction mentioned above, however, it will require very troublesome steps when a burned-out lamp in one of the lamp casings 36 is replaced by a new one. When a lamp change is required, the gauge and meter panel 22 carrying thereupon many precision instruments, such as a speedometer, odometer, tachometer and a radio set, must be dismantled from the upper and lower elongate panels 18 and 20 by removing the bolts 38. This dismantling step may cause critical trouble, for example breakage of leading wires to the meters 26 and the radio set 28. In fact, it is disadvantageous from the mechanical point of view to remove such precision instruments from their initially set positions.

Furthermore, in this conventional case, it is sometimes observed that the connection between the gauge and meter panel 22 and the upper and lower elongate panels 18 and 20 is unremovable. In this case, the lamp replacement must be inevitable made by stretching the operator's hand or hands awkwardly under, up and around to the back side of the panelling arrangement 10. In a word, the operator has to work blindly to replace the lamp. Obviously, this is very troublesome and difficult. Furthermore, if some devices such as an air conditioner, indicated by the phantom lines 46, are installed in such a position as shown, the lamp replacement becomes even more difficult.

Accordingly, as mentioned before, the present invention proposes to eliminate such drawbacks encountered in the conventional panelling arrangement.

Figure 3:
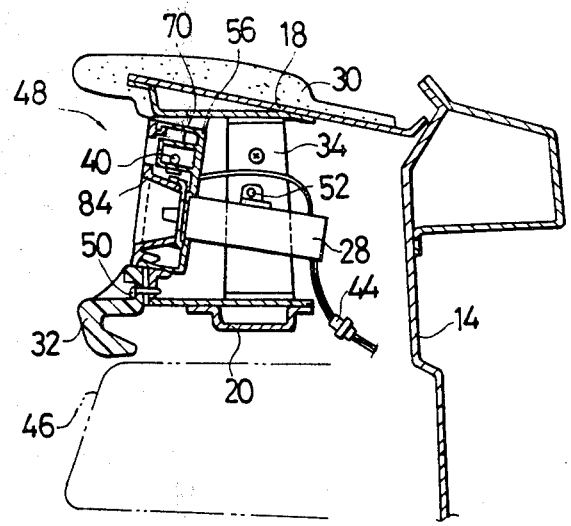
FIG. 3 is a sectional view of a first preferred embodiment of a panelling arrangement according to the present invention.
Figure 4:
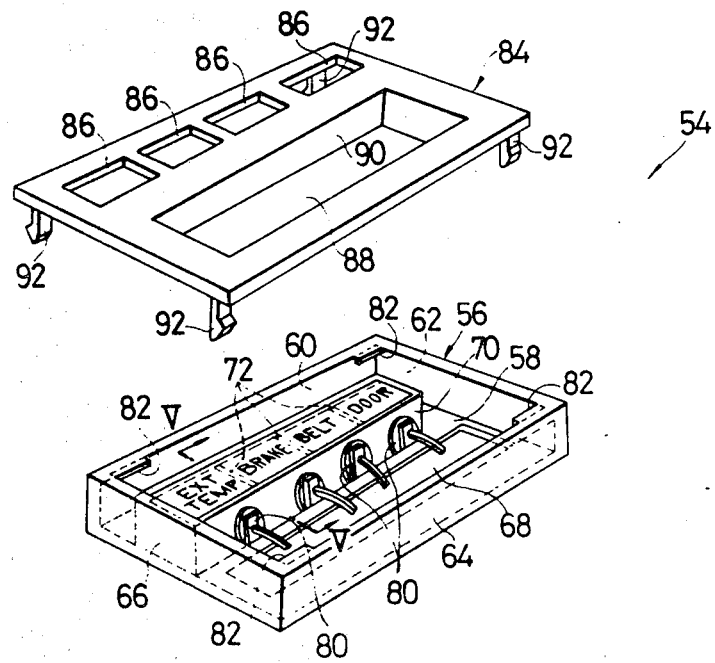
FIG. 4 is a perspective view of an indicating lamp mounting structure employed in the panelling arrangement shown in FIG. 3.

Referring to FIGS. 3 to 5, especially to FIG. 3, there is shown a first preferred embodiment of a panelling arrangement 48 according to the present invention. As seen from FIG. 3, the arrangement 48 is similar to the conventional one 10 of FIG. 2. Thus, in FIG. 3, the parts similar to those of the conventional arrangement 10 are designated by the same reference numerals as in the case of FIG. 2.

The panelling arrangement 48 of the invention comprises upper and lower elongate panels 18 and 20 which are transversely disposed in a front portion of the driver's compartment. The upper and lower elongate panels 18 and 20 are respectively covered with upper and lower padding members 30 and 32 made of foamed material, such as polyurethane foam. In this embodiment, the lower padding member 32 is shown as being connected to the lower elongate panel 20 by means of bolts 50. Spanned between the upper and lower elongate panels 18 and 20 is a cross member or plate 34 which has at its generally middle portion a bracket 52 for connecting thereto a radio set 28. Although not shown in these drawings, a so-called meter panel for carrying thereupon only meters 26 is interposed between the upper and lower elongate panels 18 and 20 at the corresponding position where the meters 26 of FIG. 1 are located, in the before-mentioned conventional manner.

In a position corresponding to the position where the gauges 24 and the ratio set 28 of FIG. 1 are located is disposed an indicating lamp mounting unit 54 which is for mounting gauges 24 and a radio set 28 on the upper and lower elongate panels 18 and 20, the mounting unit 54 being well shown in FIG. 4.

The indicating lamp mounting unit 54 may be constructed of plastics and comprises a box member 56 having a base 58 and four side walls 60, 62, 64 and 66 by which an interior space (no numeral) of the box member 56 is defined. The base 58 is formed with a relatively large rectangular opening 68 through which a radio set 28 is to be inserted. Longitudinally disposed on the base 58 of the box member 56 is an elongate lamp casing 70 which is divided into four compartments by partitions 72. As well shown in FIG. 5, each of the compartments is formed to have at its upper section a first opening 74 covered with a labeled translucent plate 76 and at its one side section a second opening 78 into which a socket 80 for an indicating lamp 40 is removably inserted. The second opening 78 is sized to freely pass the lamp 40 therethrough. Although, in FIG. 4, the elongate lamp casing 70 is shown as integral with the base 58 of the box member 56, the casing 70 may be formed as a separate member which is welded to the base 58. The box member 56 is formed at its corners with four flange portions 82 projecting from the walls 60 and 64. The reason why such flanges 82 are required may be apparent hereinlater.

Now, it should be noted that, the box member 56 is connected at its walls 60 and 64 to respective leading ends of the upper and lower elongate panels 18 and 20 in a manner that the front portion of the radio set 28 is situated in the rectangular opening 68 of the box member 56. The connection between the walls 60 and 64 and the upper and lower elongate panels 18 and 20 may be made by a conventional technic, such as welding or bolt fastening.

The mounting unit 54 further comprises a cover member 84 which is used to cover the box member 56. As well shown in FIG. 4, the cover member 84 is formed with four small rectangular openings 86 and a flanged rectangular opening 88 which openings are located to respectively align with the compartments of the elongate lamp casing 70 and the rectangular opening 68 of the box member 56 when the cover member 84 is fixed to the box member 56. Indicated by the numeral 90 are the inclined flanges of the opening 88. The cover member 84 is further provided at its corners with downwardly extending four lugs 92 each having at the leading ends a head portion engageable with a corresponding one of the before-mentioned flange portions 82. Thus, the cover member 84 can be readily fixed to the box member 56 to cover the same only by a press action. This means that the cover member 84 can be readily removed from the box member 56 only by a pulling action.

From the above, it will be appreciated that the replacement of a burned-out lamp with a new one in the panelling arrangement 48 can be easily made only by taking the following simple steps:
 (1) Removing the cover member 84 from the box member 56;
 (2) Dismantling the socket 80 of the burned-out lamp 36 from the lamp casing 70;
 (3) Replacing the lamp by a new one;
 (4) Inserting the new lamp to the lamp casing; and
 (5) Fitting the cover member 84 on the box member 56.

It should be noted that these operations can be done in a very simple manner because they can be carried out at an open space in the driver's compartment.

Referring to FIGS. 6 and 7, a second preferred embodiment of a panelling arrangement 94 according to the present invention is shown. In this case also, the similar parts to those of the conventional one 10 are designated by the same numerals as in the case of FIG. 2. The panelling arrangement 94 of the second embodiment comprises generally same parts as in the first preferred embodiment except for a base plate 96. It should be noted that the plate 96 is used as a substitute for the box member 56 of the first embodiment.

As well shown in FIG. 6, the base plate 96 is formed into an H-shape having spaced two upper leg portions 98, spaced two lower leg portions 100 and a base portion 102. Preferably, the base plate 96 is formed throughout the periphery thereof with flanges 103 as shown for increasing the mechanical strength thereof. The base portion 102 is formed with a rectangular flanged opening 104 into which a front portion of a radio set 28 is inserted, the radio set 28 being supported through a bracket 52 of a cross member 34 which is firmly interposed between upper and lower elongate panels 18 and 20. Designated by the numerals 105 are openings through which bolts (not shown) are inserted for connecting the radio set 28 to the base plate 96. Laterally transversing a rectangular space (no numeral) defined between the spaced two upper leg portions 98 is the elongate lamp casing 70 which is connected at its flanged portions 106 to the upper leg portions 98 by bolts 108.

As well shown in FIG. 7, the leading portions of the upper and lower leg portions 98 and 100 are bent at about 90° in a direction to enclose the lamp casing 70. The bent sections of the leg portions 98 and 100 are firmly connected to the upper and lower panels 18 and 20 by means of conventional technic. The upper leg portions 98 are formed at the top ends thereof with downwardly bent flanges 110 with which the corresponding lugs 92 of the cover member 84 (shown in FIG. 4) are engageable. In FIG. 7, hook members 112 for connection with the lugs 92 which are located at the lower section of the cover member 84 are shown as being separated from the lower leg portions 100 of the base plate, however, such hook members may be formed as integral with the lower leg portions 100. Designated by the numeral 114 are brackets which project from the radio set 28 for tightly receiving the before-mentioned bolts passing through the openings 105.

With this construction of the second preferred embodiment, the cover member 84 can be readily amounted to and readily removed from the base plate 96 by simple respective press and pull actions. This means simplicity of the replacement of a burned-out lamp with a new one.

Several examples regarding to a unit of the lamp casing and the cover member are illustrated in FIGS. 8 to 11. These examples are substantially employable in the panelling arrangements 48 and 94 of the first and second preferred embodiments.

Figure 8:
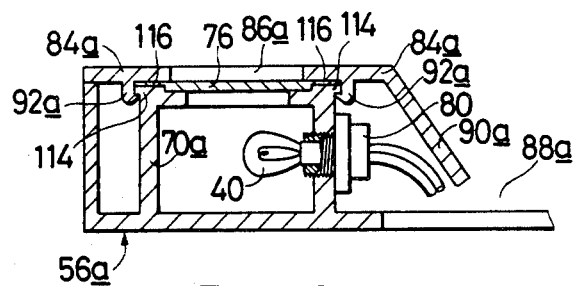
FIGS. 8 to 11 are views similar to FIG. 5 but showing several examples regarding a unit of lamp casing and cover member.

The unit partially shown in FIG. 8 comprises a box member 56a and a cover member 84a which are separable from each other. The box member 56a is formed to have a lamp casing portion 70a which has at its upper section an opening covered by a labeled translucent plate 76 and at its side section an opening into which a socket 80 for an indicating lamp 40 is removably inserted. As shown, the lamp casing portion 70a is formed at the upper end thereof with laterally outwardly extending flanges 114. The cover member 84a is formed to have an inclined flange portion 90a at a rectangular opening 88a for a radio set 28, and downwardly projecting lugs 92a which are removably hookable to the flanges 114. Packing members such as rubber packs 116 are disposed between the cover member 84a and the box member 56a for tight connection between them. Although not shown in this drawing, the other section (the section omitted from this drawing) of the unit has substantially the same construction as in the cases of the before-mentioned first and second embodiments.

Figure 9:
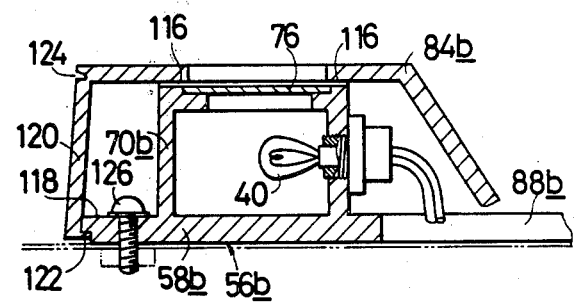

The unit of FIG. 9 is similar to that of FIG. 8 and comprises a box member 56b and a cover member 84b which are also separable from each other. In this example, the box member 56b is formed at the peripheral edge of the base 58b thereof with a laterally extending flange 118. The cover member 84b is formed with a side wall 120 which has at its leading end a hook portion 122 engageable with the flange 118 of the box member 56b. The side wall 120 is formed swingable relative to the cover member 84b proper by a hinge portion 124. For the tight connection between the cover member 84b and the box member 56b, some packings 116 are employed. Designated by the numeral 126 is a bolt for fixing the box member 56b to a suitable stationary member of the panelling arrangement. Also in this case, the other section of the unit, omitted from this drawing, has substantially the same in construction as in the cases of the first and second embodiments.

Figure 10:
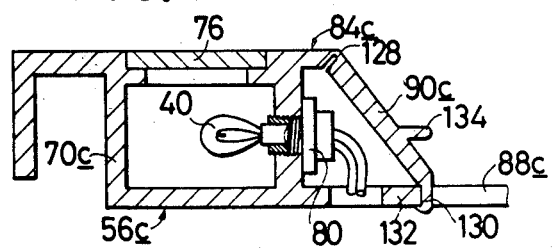

The unit of FIG. 10 comprises a box portion 56c and a cover portion 84c which are integral with each other. The box portion 56c is formed at its one side with a lamp casing portion 70c for containing therein an indicating lamp 40. A labeled translucent plate 76 and a socket 80 are connected to the lamp casing portion 70c in a generally same manner as in the case of FIG. 8. In this example however, a flange portion 90c of a rectangular opening 88c for the radio set 28 is formed swingable with respect to the cover portion 84c by a hinge portion 128. The leading end of the swingable flange portion 90c is formed into a hook 130 engageable with an inward edge 132 of the box portion 56c. The numeral 134 designates a handle or grip member which is used for facilitating the opening action of the swingable flange portion 90c. Although not shown in this drawing, the section omitted from this drawing has substantially the same construction as in the case of first and second embodiments except that the cover portion and the box portion are integral with each other. From this, it will be appreciated that the replacement of the burned-out lamp with a new one can be simply made because of provision of the openable section in the unit of the box portion and the cover portion.

Figure 11:
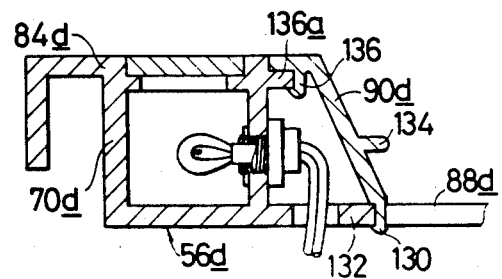

The unit shown in FIG. 11 is another example similar to that of FIG. 10. In this example, a separate cover member 90d is used as a substitute for the swingable flange 90c of FIG. 10. The cover member 90d is provided at its both ends with hooks 130 and 136 which are removably engageable with an inward edge 132 of a box portion 56d and another inward edge 136a of a cover portion 84d. With this construction, the separate cover member 90d can be readily removed from the unit proper by pulling a handle or grip member 134.

With the above-described construction of the panelling arrangements according to the present invention, the replacement of the burned-out lamp with a new one is done only by removing or opening the so-called cover member, dismantling the socket of the damaged lamp from the lamp casing, replacing the burned-out lamp by a new one, mantling the socket of the new lamp to the lamp casing, and fitting the cover member to its initially set position. It should be noted that this can be done very simply because it is carried out at an open place in the driver's compartment.

It should be noted that the foregoing description shows only exemplary embodiments. Various modifications are apparent to those skilled in the art within departing from the scope of the present invention which is only limited by the appended claims.

What is claimed is:

1. A panelling arrangement for a motor vehicle having a dashboard in front of a driver's compartment, comprising:
   a base member securely connected to said dashboard;
   a lamp casing mounted on said base member and containing therein an indicating lamp and having first and second openings, said first opening being covered with a labeled translucent plate and said second opening being sized to permit said indicating lamp to pass therethrough, said lamp casing being such arranged that said first opening faces toward said driver's compartment and said second opening is located in a position where said indicating lamp in said casing is serviced and installed from the side of said driver's compartment;
   a socket member detachably disposed in said second opening of said lamp casing while removably holding said indicating lamp in said lamp casing;
   a cover member for covering unsightly parts surrounding said lamp casing;
   a first member integrally connected to said base member; and
   a second member integrally connected to said cover member,
   said first and second members being lockable with each other in a snap action manner so that said cover member is stationarily retained by said base member, covering the unsigntly parts surrounding said lamp casing.

2. A panelling arrangement as claimed in claim 1, in which said base member and said lamp casing are integral with each other.

3. A panelling arrangement as claimed in claim 2, in which said base member is formed like a box having walls and a base by which an interior space of said base member is defined for disposing therein said lamp case.

4. A panelling arrangement as claimed in claim 2, in which said base is formed into an H-shaped plate having at its upper side first spaced leg portions and at its lower side second spaced leg portions, said first and second leg portions being bent in a direction to enclose said lamp case.

5. A panelling arrangement as claimed in claim 4, in which said first member is formed on a leading end of one of said first spaced leg portions.

6. A panelling arrangement as claimed in claim 2, in which said cover member has a portion integral with said lamp case.

7. A panelling arrangement as claimed in claim 1, in which said cover member is formed with a handling lug.

8. A panelling arrangement for mounting an indicating lamp on a dashboard of a motor vehicle having a driver's compartment, comprising:
   a lamp casing member containing therein said indicating lamp and having therein first and second openings, said first opening being covered with a labeled translucent plate and said second opening being sized to allow said indicating lamp to pass therethrough, said lamp casing member being connected to said dashboard in such an arrangement that said first and second opening are substantially exposed to said driver's compartment;
   a socket member detachably inserted into said second opening of said lamp casing member while removably holding said indicating lamp in said lamp casing member;
   a cover member for covering unsightly parts surrounding said lamp casing member;
   fixing means for releasably fixing said cover member relative to said lamp casing member in a snap action manner;
   a rigid elongate panel member transversely and stationarily disposed inside said driver's compartment while incorporating with said dashboard; and
   a base member firmly fixed to said rigid elongate panel member, said base member being integral with said lamp casing member and formed like a box having walls and a base by which an interior space of said base member is defined for setting therein said lamp casing member, the box-shaped base member being formed at free end portions of said walls with laterally extending first flanges which constitute one part of said fixing means, and said cover member being provided with lugs each having at its free end a head portion releasably lockable to a corresponding one of said first flanges, said lugs constituting the other part of said fixing means.

9. A panelling arrangement for mounting an indicating lamp on a dashboard of a motor vehicle having a driver's compartment, comprising:
   a lamp casing member containing therein said indicating lamp and having therein first and second openings, said first opening being covered with a labeled translucent plate and said second opening being sized to allow said indicating lamp to pass therethrough, said lamp casing member being connected to said dashboard in such an arrangement that said first and second openings are substantially exposed to said driver's compartment;
   a socket member detachably inserted into said second opening of said lamp casing member while removably holding said indicating lamp in said lamp casing member;
   a cover member for covering unsightly parts surrounding said lamp casing member;
   fixing means for releasably fixing said cover member relative to said lamp casing member in a snap action manner;
   a rigid elongate panel member transversely and stationarily disposed inside said driver's compartment while incorporating with said dashboard; and
   a base member firmly fixed to said rigid elongate panel member and firmly supporting said lamp casing member, said base member being formed into an H-shaped plate having at its upper side first spaced leg portions and at its lower side second spaced leg portions, said first and second spaced leg portions being bent into a direction to enclose said lamp casing member and firmly fixed to said rigid elongate member.

10. A panelling arrangement as claimed in claim 9, in which the H-shaped base member is formed throughout the periphery thereof with flanges for increasing the mechanical strength thereof.

11. A panelling arrangement as claimed in claim 10, in which the leading ends of said first spaced leg portions are provided with second flanges which constitute one part of said fixing means, and in which said cover member is provided at its one side with first lugs each having at its leading end a head portion releasably lockable to a corresponding one of said second flanges of said first spaced leg portions, said first lugs constituting the other part of said fixing means.

12. A panelling arrangement as claimed in claim 11, further comprising hook members fixed to the lower part of said rigid elongate panel member, said hook members being releasably engageable with second lugs which are projected from the other side of said cover member, said second lugs constituting the other part of said fixing means.

13. A panelling arrangement for mounting an indicating lamp on a dashboard of a motor vehicle having a driver's compartment, comprising:
   a lamp casing member containing therein said indicating lamp and having therein first and second openings, said first opening being covered with a labeled translucent plate and said second opening being sized to allow said indicating lamp to pass therethrough, said lamp casing member being connected to said dashboard in such an arrangement that said first and second openings are substantially exposed to said driver's compartment;
   a socket member detachably inserted into said second opening of said lamp casing member while removably holding said indicating lamp in said lamp casing member;
   a cover member for covering unsightly parts surrounding said lamp casing member;
   fixing means for releasably fixing said cover member relative to said lamp casing member in a snap action manner;
   a rigid elongate panel member transversely and stationarily disposed inside said driver's compartment while incorporating with said dashboard; and
   a base member firmly fixed to said rigid elongate panel member and firmly supporting said lamp casing member, said base member being firmly fixed to said rigid elongate panel member, said base member being integral with said lamp casing member and formed like a box having walls and a base by which an interior space of said base member is defined for setting therein said lamp casing member, the box-shaped base member and said cover member being formed integral with each other, said cover member being provided with a swingable flange portion which has at its leading end a hook portion which is engageable with an edge portion of said base member so that the swingable flange portion is operable to conseal said socket when said hook portion is engaged with said edge portion.

* * * * *